US012503878B2

(12) United States Patent
Ogata et al.

(10) Patent No.: US 12,503,878 B2
(45) Date of Patent: Dec. 23, 2025

(54) POLE AND POLE UNIT

(71) Applicant: NEC Corporation, Tokyo (JP)

(72) Inventors: Kazuki Ogata, Tokyo (JP); Satoru Koizumi, Kanagawa (JP); Satoshi Hagiwara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/836,081

(22) PCT Filed: Feb. 14, 2022

(86) PCT No.: PCT/JP2022/005653
§ 371 (c)(1),
(2) Date: Aug. 6, 2024

(87) PCT Pub. No.: WO2023/152963
PCT Pub. Date: Aug. 17, 2023

(65) Prior Publication Data

US 2025/0137602 A1 May 1, 2025

(51) Int. Cl.
*E04H 12/00* (2006.01)
*F21S 8/08* (2006.01)

(52) U.S. Cl.
CPC ........... *E04H 12/00* (2013.01); *E04H 12/003* (2013.01); *F21S 8/086* (2013.01)

(58) Field of Classification Search
CPC ......... E04H 12/003; F21S 8/085; F21S 8/086; F21S 8/088
See application file for complete search history.

(56) References Cited

U.S. PATENT DOCUMENTS 9,433,034 B2 * 8/2016 Hendrix .................. H01Q 1/36
10,411,336 B1 * 9/2019 Schwartz ................ H01Q 1/12
11,365,554 B2 * 6/2022 Chia .................... E04H 12/003
2009/0273261 A1 * 11/2009 Fournier ............ E04H 12/2292 312/237
2020/0080696 A1 * 3/2020 Ducros .................. F21S 8/086
2020/0116318 A1 * 4/2020 Bembridge ............ F21V 21/10
2020/0190842 A1 * 6/2020 Ducros ................... H05K 7/18
2021/0320393 A1 * 10/2021 Williams ............. H04W 88/08
2024/0147653 A1 * 5/2024 Tsorng ................ H05K 5/0213

FOREIGN PATENT DOCUMENTS

EP 1193357 A2 * 4/2002 .......... E04H 12/003
JP 2017-059414 A 3/2017
JP 2019-190002 A 10/2019
WO WO-2021167951 A1 * 8/2021 .......... E04H 12/003
WO WO-2021253085 A1 * 12/2021

OTHER PUBLICATIONS

International Search Report for PCT Application No. PCT/JP2022/005653, mailed on Apr. 19, 2022.

* cited by examiner

*Primary Examiner* — Alexander K Garlen
(74) *Attorney, Agent, or Firm* — Sughrue Mion, PLLC

(57) ABSTRACT

A module includes coupling parts configured to be coupled to another pole unit and a device accommodation part configured to be able to accommodate a device. The device accommodation part includes a first region and a second region. The first region is a region accessible by a first user. The second region is a region accessible by a second user.

17 Claims, 6 Drawing Sheets

POLE AND POLE UNIT

This application is a National Stage Entry of PCT/JP2022/005653 filed on Feb. 14, 2022, the contents of all of which are incorporated herein by reference, in their entirety.

TECHNICAL FIELD

The present disclosure relates to a pole and a pole unit.

BACKGROUND ART

As the related art, Patent Literature 1 discloses a pole to which a device can be attached. The pole disclosed in Patent Literature 1 includes a cylindrical support pillar and one or more coupling poles. The coupling pole includes a cylindrical body. The cylindrical body includes a first connection part provided at one end thereof in the longitudinal direction, a second connection part provided at the other end thereof in the longitudinal direction, and a device attachment part to which a device is attached. The first connection part of each of the coupling poles is configured to be connectable to the second connection part of another coupling pole. The support pillar includes a fixed part provided at one end thereof in the longitudinal direction and a third connection part provided at the other end thereof in the longitudinal direction. The third connection part is configured to be connectable to the first connection part or the second connection part of the coupling pole.

In Patent Literature 1, the fixed part of the support pillar includes a base plate. The base plate is fixed to a foundation provided on the ground using a fixing bolt. For example, the second connection part of the coupling pole is connected to the third connection part of the support pillar, and the coupling pole is connected onto the support pillar. On the coupling pole connected to the support pillar, any number of coupling poles may be connected by connecting the first connection part of one coupling pole to the second connection part of another coupling pole. A device such as a lighting fixture, a security camera, a speaker, or an automatic flashing device is attached to the device attachment part of each coupling pole.

CITATION LIST

Patent Literature

Patent Literature 1: Japanese Unexamined Patent Application Publication No. 2019-190002

SUMMARY OF INVENTION

Technical Problem

In Patent Literature 1, the device and the coupling pole are separate bodies, and the device is externally attached to the body of the coupling pole. In Patent Literature 1, since the device is attached to an outer side of the coupling pole, there is a problem that the device is easily affected by the external environment.

In view of the above circumstances, an object of the present disclosure is to provide a pole unit capable of accommodating a device therein, and a pole in which such a pole unit is used.

Solution to Problem

To achieve the above object, the present disclosure provides a pole unit as a first example aspect. The pole unit includes a coupling part configured to be coupled to another pole unit and a device accommodation part configured to accommodate a device. The device accommodation part includes a first region accessible by a first user and a second region accessible by a second user.

The present disclosure provides a pole as a second example aspect. The pole includes a plurality of pole units coupled to form the pole. At least some of the plurality of pole units include a device accommodation part configured to accommodate a device. The device accommodation part includes a first region accessible by a first user and a second region accessible by a second user.

Advantageous Effects of Invention

The pole and the pole unit according to the present disclosure can accommodate a device in the pole unit.

EXAMPLE EMBODIMENT

The example embodiments according to the present disclosure will be described hereinafter in detail with reference to the drawings. Note that, for the clarification of the description, the following descriptions and the drawings are partially omitted and simplified as appropriate. Further, the same elements and similar elements are denoted by the same reference symbols throughout the drawings, and redundant descriptions are omitted as necessary.

Figure 1A:
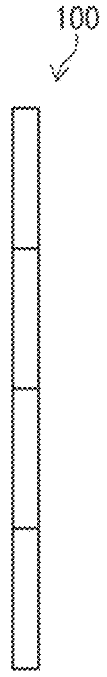
FIG. 1A is a front view of a pole from the front according to an example embodiment of the present disclosure.
Figure 1B:
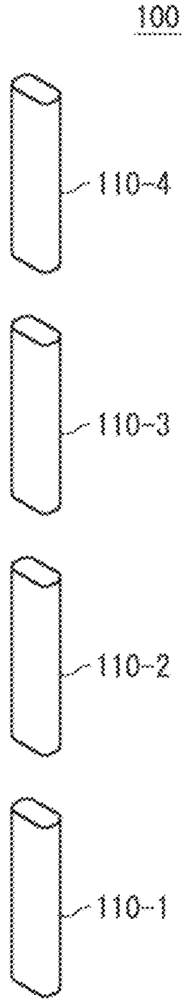
FIG. 1B is an exploded perspective view of a pole in an oblique direction according to an example embodiment of the present disclosure.

Each of FIGS. 1A and 1B shows a pole according to an example embodiment of the present disclosure. FIG. 1A is a front view of a pole 100 from the front thereof, while FIG. 1B is an exploded perspective view of the pole 100 in an oblique direction. The pole 100 has a plurality of modules 110-1 to 110-4 coupled to each other. In the following description, the modules 110-1 to 110-4 are also referred to as modules 110 when it is not particularly necessary to distinguish the modules from each other. The modules 110 may also be referred to as a pole unit or an assembly (ASSY).

The module 110 includes coupling parts configured to be coupled to another module and a device accommodation part configured to be able to accommodate a device. In an example embodiment, the pole 100 is configured as a multifunctional pole including various devices in the modules 110-1 to 110-4. In the modules 110-1 to 110-4, for example, devices such as an edge computer (Multi-access/Mobile Edge Computing (MEC) server), a security camera, a wireless communication device, and a 5th Generation (5G) base station can be accommodated.

Note that, of the plurality of modules 110, the lowermost modules 110-1 may be coupled to a module serving as a base unit. The module of the base unit may, for example, be at least partially embedded in the ground. However, it is not particularly limited thereto. Alternatively, the module of the base unit may be coupled to a foundation disposed in the ground using a fastening bolt and the like. The module of the base unit may be coupled to a support pillar embedded in the ground.

The module of the base unit may, for example, be a module constituting a shared unit. The module of the base unit may include therein devices such as a power supply apparatus and a network apparatus. The power supply apparatus supplies power to devices mounted on the modules 110. The module of the base unit may include a power meter for monitoring the amount of power consumed in the modules. The network apparatus is connected to an external network. The devices mounted on the modules 110 may be configured so that the devices can communicate with the external network through the network apparatus of the module of the base unit.

Further, FIGS. 1A and 1B show an example in which one pole has four modules 110, but the number of modules 110 to be coupled in the pole 100 is not particularly limited. The pole 100 only needs to have a plurality of modules 110 to be coupled to each other.

Figure 2:
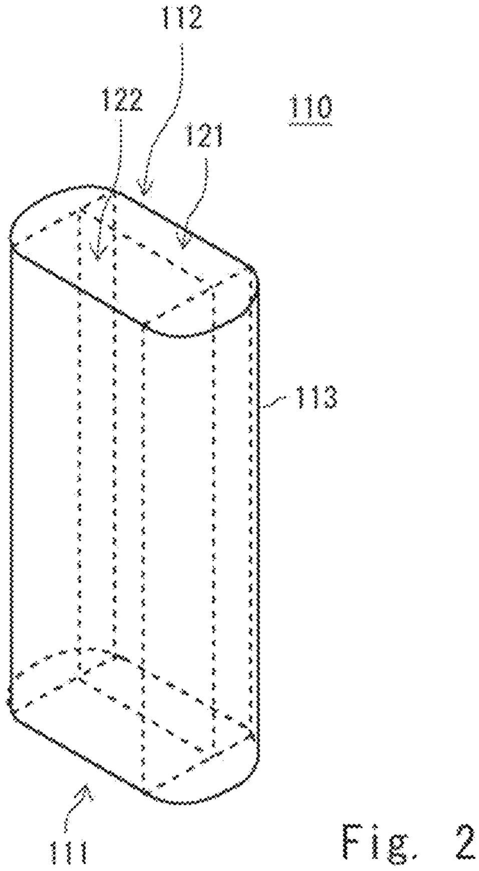
FIG. 2 is a perspective view showing an example of a module.

FIG. 2 is a perspective view showing an example of the module 110. The module 110 includes a cylindrical body 113. The body 113 is formed of a material such as metal. The body 113 may be formed of various types of materials depending on the strength required for the module and the weight allowed for the module. For example, the module 110 that is expected to be installed at a high position in the pole 100 may be formed of a light material such as carbon fiber.

In a present example embodiment, a business operator who installs the pole 100 or a business operator who owns the pole 100 can rent a device accommodation part (right of use thereof) in the module 110 to another business operator. Hereinafter, the business operator who installs the pole 100 or the business operator who owns the pole 100 is referred to as a first user, and the business operator who leases the device accommodation part is referred to as a second user. The first user can rent the device accommodation part to the second user, for example, in the unit of the module 110. The second user can dispose a device having a predetermined function in the device accommodation part.

In the present example embodiment, wiring or the like in the module 110 is prepared by the first user, and the second user connects a device to the prepared wiring for use. In that case, if the second user can freely touch the wiring in the module 110 prepared by the first user, there is a possibility of accidentally damaging the wiring connected to another module 110 to be coupled. Further, if the first user can freely touch the device in the module 110 which has been disposed by the second user, it is difficult to clarify who is responsible in a case where the device malfunctions.

In order to alleviate at least the above problem, in the present example embodiment, the device accommodation part has a first region 121 and a second region 122. The first region 121 is a region accessible by the first user. The second region 122 is a region accessible by the second user. Here, being accessible means that a user can come into physical contact with an object such as a device disposed in a space of each region. The user can access the first region or the second region to be able to perform arrangement or maintenance of a device, or replacement of a component.

The first region 121 is, for example, a region that can be accessed by the first user but cannot be accessed by the second user. The second region is a region that can be accessed by the second user but cannot be accessed by the first user. In the modules 110-1 to 110-4 shown in FIGS. 1A and 1B, in a case of different second users for respective modules, the second region 122 of each module is assumed to be accessible only by the second user to whom the device accommodation part of each unit is rented.

For example, shared equipment is disposed in the first region 121. A device having a predetermined function is disposed in the second region 122. The first regions 121 may be connected between the modules 110 to be coupled. On the other hand, the second region 122 is assumed to be an independent region for each module 110. Even in a case where the device disposed in the second region 122 is changed, the shared equipment is commonly used by the devices. In the first region 121, for example, at least one of a communication line and a power supply line is disposed. The device disposed in the second region 122 is connected to at least one of the communication line and the power supply line disposed in the first region 121. In the first region 121, a distribution board for supplying power to the device disposed in the second region 122 may be disposed.

The module 110 has a coupling part at each end portion which is coupled to another module. In the example of FIG. 2, the module 110 has a first coupling part 111 positioned at an end portion in a first direction and a second coupling part 112 positioned at an end portion in a second direction opposite to the first direction. Each of the first coupling part 111 and the second coupling part 112 includes an interface for performing connection to at least one of the communication line and the power supply line disposed in the first region 121 of a module to be coupled.

Figure 3:
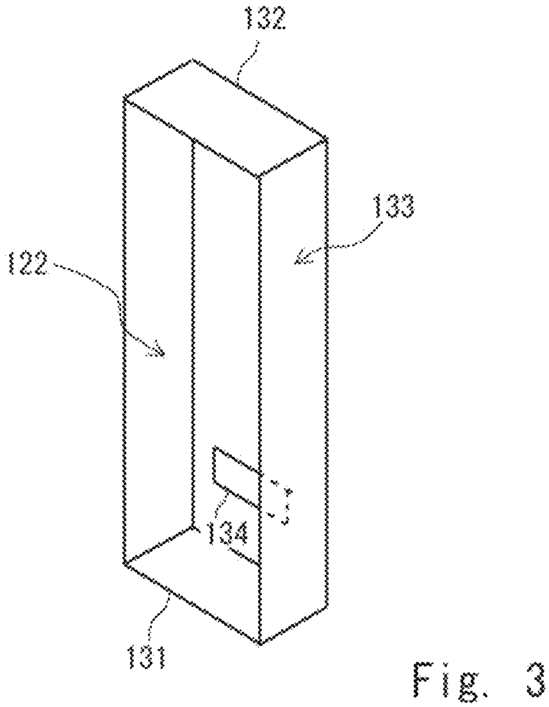
FIG. 3 is a perspective view showing an example of a partition used for separating a second region.

The second region 122 is separated from the first region 121 using, for example, a partition, a partition wall, or the like. FIG. 3 shows an example of a partition used for separating the second region 122. The partition has a first partition 133 and second partitions 131 and 132. The first partition 133 separates the first region 121 from the second region 122. The first partition 133 may function as a partition wall that inhibits physical access between the first region 121 and the second region 122. The second partitions 131 and 132 separate the second region 122 from the first coupling part 111 and the second coupling part 112, respectively. The second region 122 is configured as a space surrounded by the first partition 133 and the second partitions 131 and 132.

The first partition 133 may have an opening 134 which enables air to pass between the first region 121 and the second region 122. In the present example embodiment, the opening 134 is used as a vent. The opening 134 only needs to have a ventilation characteristic, and may be at least partially closed with, for example, a mesh-like net. In the module 110, a position of the opening 134 may be determined at a predetermined position. The device disposed in the module 110 may have a blast fan for exhaust heat at the position of the opening 134. In a case where the position of the opening 134 and the position of the blast fan are determined at predetermined positions, heat can be discharged from the second region to the first region 121 without depending on a device disposed in the second region 122.

A cross-sectional shape of the module 110 in a plane perpendicular to a longitudinal direction may be elliptical or oblong. However, it is not limited to a particular shape. Lengths of the respective modules (lengths of the pole in the longitudinal direction) may be different from each other or the same as each other. When the cross-sectional shape is elliptical or oblong in a plane perpendicular to the longitudinal direction of each module, a device can be accommodated more efficiently than when the cross-sectional shape is circular. Further, an impression of the appearance can be improved.

The modules 110 may have a first cover member covering the first region 121 and a second cover member covering the second region 122. The first cover member protects the shared equipment disposed in the first region 121 from rain or wind. The second cover member protects the device disposed in the second region 122 from rain or wind. The first cover member and the second cover member may have an openable/closable mechanism, or may be detachably attached to the body 113.

Figure 4:
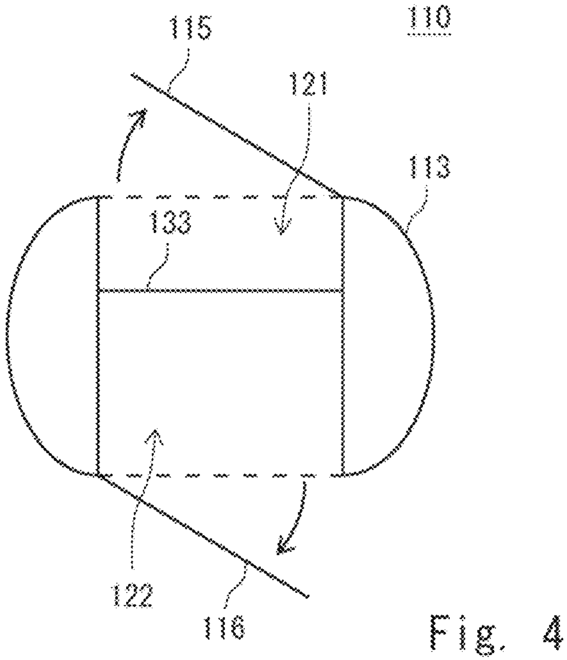
FIG. 4 is a top view showing an example of a module having a door.

FIG. 4 shows an example of a module 110 having a door. The module 110 includes, as the first cover member, a first door 115 on an opening surface side of the first region 121. Further, the module 110 includes, as the second cover member, a second door 116 on an opening surface side of the second region 122. The first door 115 and the second door 116 are configured to be openable and closable with respect to the body 113. At least one of the first cover member and the second cover member may be a lid detachably attached to the body 113 using a screw or the like. The first door 115 is provided to have a key that can be unlocked by the first user. The second door 116 is provided to have a key that can be unlocked by the second user. The key may be a mechanical key or an electronic key.

The first user can unlock the key of the first door 115 and open the first door 115 to access the first region 121. It is assumed that the first user can unlock keys of the first doors 115 of all of the plurality of modules 110 forming the pole 100. The second user can unlock the key of the second door 116 and open the second door 116 to access the second region 122. It is assumed that the second user can unlock only the key of the second door 116 of the module 110 in which the device is disposed by the second user, and cannot unlock a key of the second door 116 of a module 110 in which a device is disposed by another user.

The first region 121 and the second region 122 are partitioned by the first partition 133. Therefore, the first user does not accidentally touch the device disposed in the second region 122 while working on the shared equipment disposed in the first region 121. Further, the second user does not accidentally touch the shared equipment disposed in the first region 121 while working on the device disposed in the second region 122.

The second region 122 is closed by the second partitions 131 and 132 (see FIG. 3) at the first coupling part 111 and the second coupling part 112 (see FIG. 2). In the present example embodiment, since the second region 122 is formed as a closed space for each module 110, the second region 122 is ensured to be independent for each module 110. When a worker is working with the second door 116 open in a certain module 110, the second partitions 131 and 132 can protect devices disposed in the second regions 122 of the upper-side and lower-side modules 110 from being damaged or modified.

Figure 5:
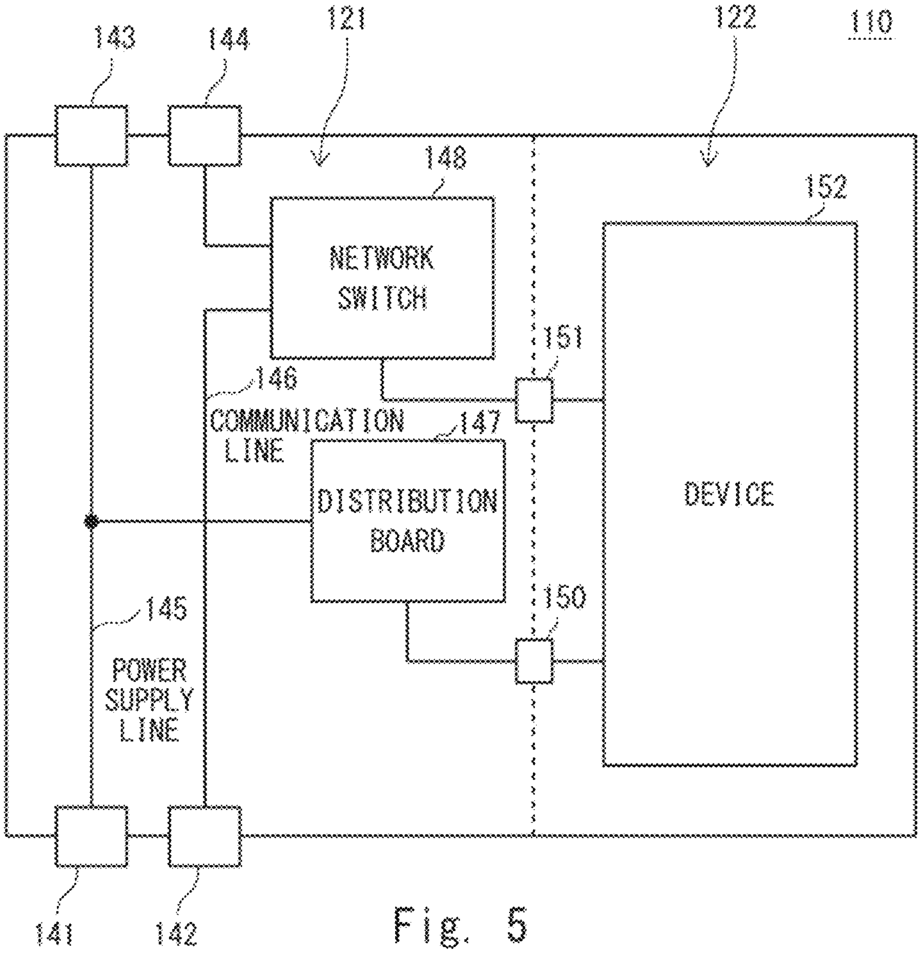
FIG. 5 is a block diagram showing an example of shared equipment and a device arranged in a first region and a second region.

FIG. 5 shows an example of shared equipment and a device disposed in the first region 121 and the second region 122, respectively. In this example, a power supply line 145, a communication line 146, a distribution board 147, and a network switch 148 are arranged in the first region 121. Further, a device 152 having a predetermined function is disposed in the second region 122. A rail is formed in the second region 122, and the device 152 may slide on the rail and be inserted into the second region 122.

The module 110 includes a power supply line interface 141 and a communication line interface 142 as interfaces with the lower-side module 110. The module 110 includes a power supply line interface 143 and a communication line interface 144 as interfaces with the upper-side module 110.

In the module 110, the power supply line 145 is connected to the power supply line interfaces 141 and 143. Each of the power supply line interfaces 141 and 143 has a terminal connected to the power supply line 145 in the module 110. By connecting the power supply line interface 143 of the lower-side module 110 and the power supply line interface 141 of the upper-side module 110, the power supply line 145 of the lower-side module 110 and the power supply line 145 of the upper-side module 110 are connected. The power supply line interface 141 of the lowermost module 110 is connected to, for example, a power supply apparatus provided in the module of the base unit. The power supply line 145 may include power supply lines of a plurality of types of voltages. The power supply line 145 includes, for example, a DC power supply line and an AC power supply line. The power supply line 145 branches to the distribution board 147. The distribution board 147 includes, for example, a circuit breaker having a function such as an earth leakage protection function.

In the module 110, the communication line 146 is connected to the communication line interfaces 142 and 144. Each of the communication line interfaces 142 and 144 has a terminal connected to the communication line 146 in the module 110. By connecting the communication line interface 144 of the lower-side module 110 and the communication line interface 142 of the upper-side module 110, the communication line 146 of the lower-side module 110 and the communication line 146 of the upper-side module 110 are connected. The communication line interface 142 of the lowermost module 110 is connected to, for example, a communication apparatus provided in the module of the base unit. The communication line 146 is connected to the network switch 148. The network switch 148 is configured as a network apparatus such as a Layer 2 switch, for example.

A connector 150 for power supply and a connector 151 for communication may be arranged at a boundary between the first region 121 and the second region 122, for example, the first partition 133 shown in FIG. 3. The connector 150 for power supply includes a terminal connected to the distribution board 147. The connector 151 for communication includes a terminal connected to the network switch 148. The device 152 can receive power supply from the distribution board 147 through the connector 150 for power supply. Further, the device 152 is connected to the network switch 148 through the connector 151 for communication, and can communicate with an external device. The device 152 may be connected to the distribution board 147 and the network switch 148 through the opening 134 formed in the first partition 133. Positions of the connector 150 for power supply and the connector 151 for communication may be determined at predetermined positions. Further, the device 152 may have connectors for performing connection to the connector 150 for power supply and the connector 151 for communication at predetermined positions. In this case, the connector 150 for power supply and the connector 151 for communication can be connected to the connectors of the device 152 without depending on the device 152 disposed in the second region 122.

Openings may be formed in portions of the first coupling part 111 and the second coupling part 112 (see FIG. 2) corresponding to the first region 121, and the first region 121 may be configured to allow air to pass between the plurality of modules 110. The pole 100 may have a mechanism for discharging heat to the outside in the upper-side module 110, the lower-side module 110, or the module of the base unit. In that case, heat of the device 152 disposed in the second region 122 may be transferred to the first region 121 through the opening 134 (see FIG. 3) and discharged to the outside through the upper-side and lower-side modules 110.

Note that, in the above example embodiment, an example has been described in which the power supply line interfaces 141 and 143 and the communication line interfaces 142 and 144 are provided at the coupling parts, and the modules 110 are coupled to connect the power supply lines 145 and the communication lines 146 of the modules. However, the present example embodiment is not limited thereto. For example, the first user may individually arrange the power supply line and the communication line from a power supply apparatus to each of the plurality of coupled modules 110 in the first region 121.

In the present example embodiment, the module 110 has the first region 121 and the second region 122. The first region 121 is used by the first user, for example, for disposing the shared equipment, and the second region 122 is used by the second user, for example, for disposing the device having a predetermined function. The first region 121 is accessible by the first user, and the second region 122 is accessible by the second user. In the present example embodiment, it is possible to restrict, for each region, a user who can access.

In the present example embodiment, the first user can access the first region 121 of each module 110, and the second user can access the second region 122 of the module 110 in which the device 152 is disposed by the second user. The second user can dispose the device 152 having a predetermined function in the second region 122. Further, after the device 152 is disposed, the second user can perform work on the disposed device 152. On the other hand, the first user can work on the shared equipment disposed in the first region 121. However, the first user cannot freely access the second region 122 in which the second user has disposed the device 152. In the present example embodiment, since only the second user can touch the device 152, there is no concern that the device 152 will be tampered by a person other than the second user.

In comparison with Patent Literature 1, according to the coupling pole described in Patent Literature 1, a device is externally attached to the body of the coupling pole. In Patent Literature 1, since the device is exposed to the outside, there is a concern about tampering, damage, or the like. On the other hand, in the present example embodiment, the device 152 is disposed in the second region 122 that can be accessed by the second user. Therefore, the device 152 can be protected from tampering, damage, or the like. Further, according to Patent Literature 1, as the number of devices attached to the body of the coupling pole increases, the coupling pole starts to have a cluttered appearance. For example, when the above pole is installed in a park or the like, the pole does not harmonize with the landscape in a place where the pole is installed, and hence the pole may spoil the landscape. On the other hand, in the present example embodiment, the device is accommodated inside the module 110. Therefore, the pole 100 according to the present example embodiment has an advantage that the device does not spoil the landscape.

In the above example embodiment, the example in which the pole 100 is formed by coupling the plurality of modules 110 has been described. However, the present disclosure is not limited thereto. In the present disclosure, the pole 100 may include a module in which the device having a predetermined function is fixedly disposed. The module in which the device having the predetermined function is fixedly disposed includes a region corresponding to the first region 121 and the second region 122. For example, the pole 100 may include a module to which a traffic light is connected, a module to which an illumination lamp is connected, a module for charging an electric vehicle, and a module including a projector which projects light onto a road or a surrounding structure. The pole 100 may include a module including a sensor for measuring a wind speed, an amount of rainfall, or a snow accumulation. The pole 100 may include a module including light detection and ranging (LiDAR) and a module including a beacon receiver. The pole 100 may be installed, for example, in a park, a shopping center, and a store. A length of the pole 100 is not limited to any particular length, and may be any length within a range from a few meters to a dozen meters.

Figure 6:
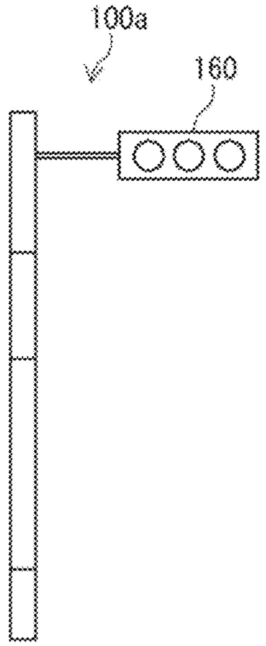
FIG. 6 is a front view showing a pole according to a first modified example of the present disclosure.

FIG. 6 shows a pole according to a first modified example. In the first modified example, a pole 100*a* is used for a traffic signal. The pole 100*a* includes one or more modules 110 in which a second user can dispose a device having a predetermined function, and a module to which a traffic light 160 is connected. The pole 100*a* may include a module to which a traffic signal for pedestrians is connected. Further, the pole 100*a* may not include a module for digital signage.

Figure 7:
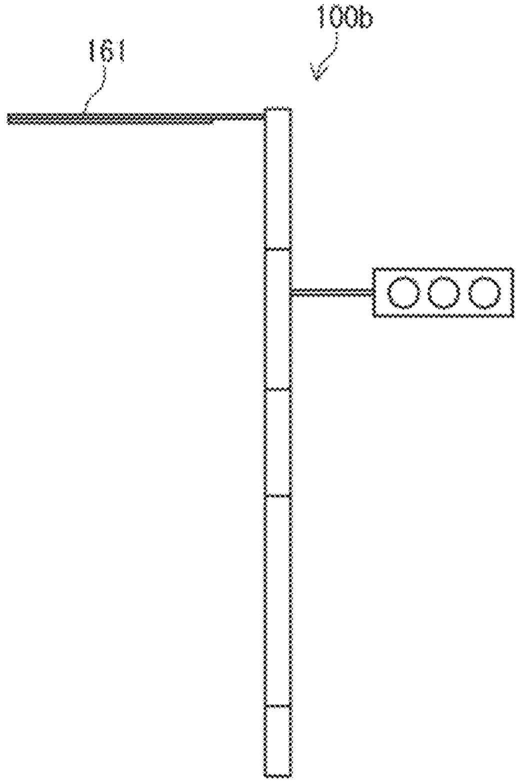
FIG. 7 is a front view showing a pole according to a second modified example of the present disclosure.

FIG. 7 shows a pole according to a second modified example. In the second modified example, a pole 100*b* includes a module to which an illumination lamp 161 is connected, in addition to the module used in the pole 100*a* shown in FIG. 6. In this example, an edge computer included in one of the modules may analyze a camera video image and control the illumination lamp 161 in accordance with a result of the analysis. For example, the edge computer may illuminate an intersection brightly by turning on the illumination lamp 161 when there is a person near the pole 100*b*. The edge computer may change the brightness and the color of the illumination lamp 161 in accordance with whether or not a person is near the pole.

Figure 8:
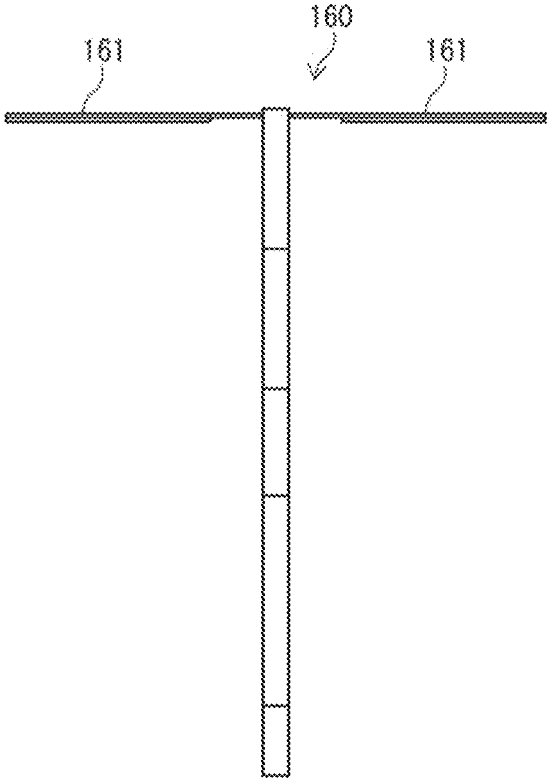
FIG. 8 is a front view showing a pole according to a third modified example of the present disclosure.

FIG. 8 shows a pole according to a third modified example. In the third modified example, a pole 100*c* is used as a pole for illumination. The pole 100*c* includes one or more modules 110 in which the second user can dispose a device having a predetermined function, and a module to which two illumination lamps 161 are connected. In this example, similarly, the edge computer included in one of the modules may turn on the illumination lamps 161 to brightly illuminate a place where the pole 100*c* is installed when there is a person near the pole 100*c*. Further, the edge computer may change the brightness and the color of each of the illumination lamps 161 in accordance with whether or not a person is near the pole.

Although the example embodiments according to the present disclosure have been described above in detail, the present disclosure is not limited to the above-described example embodiments. The present disclosure also includes those that are obtained by making changes or modifications to the above-described example embodiments without departing from the scope and spirit of the present disclosure.

For example, the whole or part of the example embodiments disclosed above can be described as, but not limited to, the following supplementary notes.

Supplementary Note 1

A pole unit including:

a coupling part configured to be coupled to another pole unit; and a device accommodation part configured to be able to accommodate a device, wherein the device accommodation part includes a first region accessible by a first user and a second region accessible by a second user.

Supplementary Note 2

The pole unit according to supplementary note 1, wherein in the first region, at least one of a communication line and a power supply line is disposed, and a device disposed in the second region is connected to at least one of the communication line and the power supply line disposed in the first region.

Supplementary Note 3

The pole unit according to supplementary note 2, wherein the coupling part includes a first coupling part positioned at an end portion in a first direction and a second coupling part positioned at an end portion in a second direction opposite to the first direction, and each of the first coupling part and the second coupling part includes an interface for performing connection to at least one of the communication line and the power supply line disposed in the first region of a pole unit to be coupled.

Supplementary Note 4

The pole unit according to any one of supplementary notes 1 to 3, wherein the first region includes a distribution board for supplying power to the device installed in the second region.

Supplementary Note 5

The pole unit according to any one of supplementary notes 1 to 4, wherein the second region is surrounded by a first partition separating the first region from the second region and a second partition separating the second region from the coupling part.

Supplementary Note 6

The pole unit according to supplementary note 5, wherein the first partition includes an opening enabling air to pass between the first region and the second region.

Supplementary Note 7

The pole unit according to any one of supplementary notes 1 to 6, wherein the coupling part includes an opening formed at a portion corresponding to the first region, and the first region is configured to enable air to pass between a plurality of pole units.

Supplementary Note 8

The pole unit according to any one of supplementary notes 1 to 7, further including a first cover member configured to cover the first region and a second cover member configured to cover the second region.

Supplementary Note 9

The pole unit according to supplementary note 8, wherein the first cover member includes a first door, and the second cover member includes a second door.

Supplementary Note 10

The pole unit according to supplementary note 9, wherein the first user is allowed to open the first door to access the first region, and the second user is allowed to open the second door to access the second region.

Supplementary Note 11

The pole unit according to any one of supplementary notes 1 to 10, wherein the first user is a user who rents the device accommodation part to the second user, and the second region is a region inaccessible by the first user.

Supplementary Note 12

The pole unit according to any one of supplementary notes 1 to 11, wherein, in the second region, a device having a predetermined function which is installed by the second user is accommodated.

Supplementary Note 13

A pole including:

a plurality of pole units configured to be coupled to form the pole, wherein at least some of the plurality of pole units include a device accommodation part configured to be able to accommodate a device, and the device accommodation part includes a first region accessible by a first user and a second region accessible by a second user.

Supplementary Note 14

The pole according to supplementary note 13, wherein in the first region, at least one of a communication line and a power supply line is disposed, and a device disposed in the second region is connected to at least one of the communication line and the power supply line disposed in the first region.

Supplementary Note 15

The pole according to supplementary note 13 or 14, wherein the first region includes a distribution board for supplying power to the device installed in the second region.

Supplementary Note 16

The pole according to any one of supplementary notes 13 to 15, wherein the second region is surrounded by a first partition separating the first region from the second region and a second partition separating a pole unit to be coupled from the second region.

REFERENCE SIGNS LIST

100 POLE
110 MODULE
111 FIRST COUPLING PART
112 SECOND COUPLING PART
113 BODY
115 FIRST DOOR
116 SECOND DOOR
121 FIRST REGION
122 SECOND REGION
131, 132 SECOND PARTITION
133 FIRST PARTITION
134 OPENING
141, 143 POWER SUPPLY LINE INTERFACE
142, 144 COMMUNICATION LINE INTERFACE
145 POWER SUPPLY LINE
146 COMMUNICATION LINE
147 DISTRIBUTION BOARD
148 NETWORK SWITCH
150, 151 CONNECTOR
152 DEVICE
160 TRAFFIC LIGHT
161 ILLUMINATION LAMP

What is claimed is:

1. A pole unit comprising:
- a coupling part configured to be coupled to another pole unit; and
- a device accommodation part configured to be able to accommodate a device,
- wherein the device accommodation part comprises a first region accessible by a first user and a second region accessible by a second user,
- the coupling part includes a first coupling part positioned at an end portion in a first direction and a second coupling part positioned at an end portion in a second direction opposite to the first direction, and
- each of the first coupling part and the second coupling part includes an interface for performing connection to at least one of a communication line and a power supply line disposed in the first region of a pole unit to be coupled.

2. The pole unit according to claim 1, wherein
- in the first region, at least one of the communication line and the power supply line is disposed, and
- a device disposed in the second region is connected to at least one of the communication line and the power supply line disposed in the first region.

3. The pole unit according to claim 1, wherein the first region comprises a distribution board for supplying power to a device installed in the second region.

4. The pole unit according to claim 1, wherein the second region is surrounded by a first partition separating the first region from the second region and a second partition separating the second region from the coupling part.

5. The pole unit according to claim 4, wherein the first partition comprises an opening enabling air to pass between the first region and the second region.

6. The pole unit according to claim 5, further comprising a blast fan at a position of the opening of the first partition and configured to exhaust heat.

7. The pole unit according to claim 1, wherein the coupling part comprises an opening formed at a portion corresponding to the first region, and the first region is configured to enable air to pass between a plurality of pole units.

8. The pole unit according to claim 1, further comprising a first cover member configured to cover the first region and a second cover member configured to cover the second region.

9. The pole unit according to claim 8, wherein the first cover member comprises a first door, and the second cover member comprises a second door.

10. The pole unit according to claim 9, wherein the first user is allowed to open the first door to access the first region, and the second user is allowed to open the second door to access the second region.

11. The pole unit according to claim 1, wherein
- the first user is a user who rents the device accommodation part to the second user, and
- the second region is a region inaccessible by the first user.

12. The pole unit according to claim 1, wherein, in the second region, a device having a predetermined function which is installed by the second user is accommodated.

13. A pole comprising:
- a plurality of pole units configured to be coupled to form the pole, each of the plurality of pole units comprising a coupling part configured to be coupled to another pole unit, wherein
- at least some of the plurality of pole units include a device accommodation part configured to be able to accommodate a device,
- the device accommodation part comprises a first region accessible by a first user and a second region accessible by a second user,
- the coupling part includes a first coupling part positioned at an end portion in a first direction and a second coupling part positioned at an end portion in a second direction opposite to the first direction, and
- each of the first coupling part and the second coupling part includes an interface for performing connection to at least one of a communication line and a power supply line disposed in the first region of a pole unit to be coupled.

14. The pole according to claim 13, wherein
- in the first region, at least one of the communication line and the power supply line is disposed, and
- a device disposed in the second region is connected to at least one of the communication line and the power supply line disposed in the first region.

15. The pole according to claim 13, wherein the first region comprises a distribution board for supplying power to a device installed in the second region.

16. The pole according to claim 13, wherein the second region is surrounded by a first partition separating the first region from the second region and a second partition separating the pole unit to be coupled from the second region.

17. The pole according to claim 16, wherein the first partition comprises an opening enabling air to pass between the first region and the second region, and
- the pole further comprises a blast fan at a position of the opening of the first partition and configured to exhaust heat.

* * * * *